United States Patent [19]
Klein et al.

[11] Patent Number: 5,970,243
[45] Date of Patent: Oct. 19, 1999

[54] ONLINE PROGRAMMING CHANGES FOR INDUSTRIAL LOGIC CONTROLLERS

[75] Inventors: Michael T. Klein; William Perry Su; Richard Leroy Mahn, all of Ann Arbor, Mich.; Per-Ola Gustav Forsgren, Solna, Sweden

[73] Assignee: Steeplechase Software, Inc., Ann Arbor, Mich.

[21] Appl. No.: 08/916,093

[22] Filed: Aug. 21, 1997

Related U.S. Application Data

[60] Provisional application No. 60/024,655, Aug. 27, 1996.

[51] Int. Cl.$^6$ ....................................................... G06F 9/45
[52] U.S. Cl. ......................... 395/701; 395/704; 395/709; 395/712; 364/188
[58] Field of Search ............................. 395/854, 182.06, 395/580, 401, 701, 275, 704, 709, 712; 711/1; 364/200, 147, 146, 188; 235/151.11

[56] References Cited

U.S. PATENT DOCUMENTS

| | | | |
|---|---|---|---|
| 4,115,853 | 9/1978 | Dummermuth | 395/580 |
| 4,769,767 | 9/1988 | Hilbrink | 395/182.06 |
| 4,802,116 | 1/1989 | Ward et al. | 395/500 |
| 5,079,731 | 1/1992 | Miller et al. | 364/578 |
| 5,416,908 | 5/1995 | DiCarlo et al. | 395/854 |
| 5,452,201 | 9/1995 | Pieronek et al. | 364/188 |
| 5,530,643 | 6/1996 | Hodorowski | 364/191 |
| 5,694,566 | 12/1997 | Nagae | 711/1 |

OTHER PUBLICATIONS

Ramming, Franz, "Beyond VHDL: Textual Formalism, Visual Techniques or Both?", Euro–Dac IEEE, Jul. 1996.

Banks, Jerry, "Software simulation", Proc. of 1993 winter simulation conf. ACM pp. 24–33, 1993.

Tiedemann Wolf, "An approach of multi paradigm controller synthesis from timing diagram specification", IEEE pp. 522–527, 1992.

Crews and Brewer, "Controller optimization for protocol intensive applications", Euro Dac IEEE, 1996.

Seawright et al., "A system for compiling and debugging structured data processing controllers", IEEE Euro Dac, 1996.

Yannakakis, "Online minimization of transition system", ACM 24th annual ACM STOC, pp. 264–274, May 1992.

*Primary Examiner*—Tariq R. Hafiz
*Assistant Examiner*—Anil Khatri
*Attorney, Agent, or Firm*—Rader, Fishman & Grauer PLLC

[57] ABSTRACT

A digital computer implemented software system is provided for enabling on-line programming changes of industrial logic controllers using a software package of the type utilizing graphical flowcharts is provided, allowing a user to modify a program and transfer industrial process state information while the program is controlling equipment. A control program has predetermined stop points of execution. Each stop point is assigned a unique index used to retrieve instruction addresses from an array. Each stop point also is associated with industrial process state information. By substituting new addresses pointing to stop points in a new program for the executing program addresses and transferring the state information, the executing program is replaced by a new program when execution continues on the next CPU scan. On-line programming changes take effect by replacing the executing code when all programs have reached a stop point, and by restarting a second program from the corresponding stop point in the second program.

16 Claims, 5 Drawing Sheets

ONLINE PROGRAMMING CHANGES FOR INDUSTRIAL LOGIC CONTROLLERS

This application claims benefit of Provisional Appln 60/024,655 filed Aug. 27, 1996.

FIELD OF THE INVENTION

The present invention relates generally to the control of industrial equipment and processes. More particularly, the invention relates to on-line program changes in software used to program controllers of industrial equipment and processes.

BACKGROUND OF THE INVENTION

The vast majority of industrial processes consist of a series of sequential or concurrent steps, each step involving one or more actions to be taken by a machine or machines. The steps may occur at specific times and in a specified sequence according to specific parameters, or may occur in response to specific events. Each step may have one or more elements, each element describing activities or operations with greater specificity.

In the past, industrial equipment was commonly controlled directly by interfacing the equipment with a Programmable Logic Controller, or "PLC". A PLC is a solid-state device designed to perform logic functions previously accomplished by electromechanical relays. The PLC uses output modules to actuate industrial equipment in response to physical stimuli which the PLC is programmed to recognize through input modules. PLCs still find wide use today.

The vast majority of industrial control programs are modified during their life to increase efficiency or eliminate bugs therein, to update industrial processes, or in response to underlying process changes. Some conventionally utilized control systems require that the underlying control operation be discontinued while modifying the control program, resulting in lost manufacturing time. Moreover, discontinuing some industrial processes would result in catastrophic damage to the process equipment.

Industrial control programs may be written in relay ladder logic (RLL). RLL referred to herein is a programming language in which input/output signals are written with symbols, such as electrical circuit symbols that conventionally represent relay contacts and relay coils. Control system logic is executed in a repeating sequence of operations consisting of (1) reading all physical inputs, (2) executing the logic once, (3) writing all physical outputs, and (4) performing any background activity. This sequence is known as one "scan." A RLL control program begins each scan from the top of the ladder diagram. In order to modify a RLL control program, the user must insert "new" ladder logic rung while marking as "old" any rungs which are replaced, and further marking as "unchanged" any rungs that remain unchanged. To implement the modified relay ladder logic control program, the user executes only the "new" and "unchanged" rungs while retaining the "old" rungs in memory in case the user is forced to return to the previous unmodified control program version.

Because relay ladder logic programs fully execute during each scan, the relay ladder logic programming language is referred to as "stateless", meaning a relay ladder logic program does not retain any industrial process state information after each scan, unless expressly programmed to do so. As a result, every single input and output is important to each scan in relay ladder logic.

More recently, manufacturers have sought to take advantage of the greater flexibility of general-purpose computers, including inexpensive commercially available personal computers, or "PCs", to enhance the efficiency associated with creating and maintaining software programs used to control industrial processes. Because general purpose computers can be programmed in high level commercially available languages such as BASIC, FORTRAN, C, or in object-oriented languages such as C++, manufacturers and process control vendors have been able to develop PC-based control systems that emulate traditional PLC functions. PC-based control systems are easy to use, program and maintain, and offer significant cost savings over dedicated PLC-based solutions. In many instances when a PLC is used, the PLC is connected to a central control computer. In such an arrangement, the PLC plays its own dedicated role controlling the industrial process at hand while concurrently communicating information back to the central computer.

PC-based solutions may eliminate entirely the need for a PLC. By using the high level commercially available programming languages, control programming methods have evolved which use graphical flowcharts to assist the software programmer in developing control programs which can emulate traditional PLC functions. Use of PCs in this way enables a manufacturer to develop and run the operator interface on the same PC that controls the industrial process and to share data with other programs running under the same operating system through dynamic data exchange or other standard communication mechanisms. Thus, a single PC may perform the function of the programmable logic controller, the operator panel, the programming terminal, and the real time system simulator. A PC therefore can replace three separate components: PLC programming terminal, PLC processor, and operator interface. By implementing a PC-based control system, manufacturers are able to lower control system investment costs, increase productivity in design and industrial operations, and reduce down time with built in flowchart-based diagnostics.

Unlike RLL programs, graphical flowchart-based control programs do not fully execute during each scan of the control system logic. At the beginning of each scan, the program returns to and continues from where it was last executing. A graphical flowchart program must therefore retain industrial process state information in memory between scans. In order to modify a graphical flowchart-based control program, the modified program must incorporate the existing state information into the execution of the modified program.

SUMMARY OF THE INVENTION

The present invention is directed to a graphical flowchart software system for controlling programmable controllers which enables a programmer to modify a flowchart control program while the program is controlling equipment, within the bounds of safe operation by accounting for existing industrial process state information. The software system utilizes a control program which includes graphical flowcharts for development, debugging and execution of the control program. Within the control program, graphical flowcharts pause execution after each process scan at specific predetermined stop points in the program. According to the present invention, each stop point of an executing graphical flowchart is assigned a unique address. The addresses are stored in a stop-point table. The table is used to extract the starting instruction for a particular flowchart when execution resumes in a scan. The address associated with a stop point is stored in a data area of execution state information.

Graphical flowchart code changes are made effective at a known stop point which exists in both flowcharts. An on-line programming change will take effect by replacing the executing code when all programs have reached one of these stop points, then restarting each flowchart program from the corresponding stop points in the new code. Industrial process state information is transferred between old and new graphical flowchart at each stop point. If no stop points are added or deleted, then the stop point index is valid for both old and new graphical flowcharts. However, if stop points are added or deleted in the new flowchart, then both stop point indexes must be changed so that both tables point to valid stop points in each flowchart.

Through the present invention, control program developers are provided with a software tool which decreases the time it takes to modify a control program, and which allows seamless integration of programming modifications. The present invention allows industrial process state information to be transferred between old and new programs so that the controlled industrial process is not interrupted. Further, since programming changes take effect on-line, down-time of the system is minimized. Reducing time a programmer spends implementing changes to a control program increases productivity of the industrial process. Moreover, because the changes occur during execution, productivity is maximized as down-time is minimized. Thus, the manufacturer achieves faster design cycles at a lower down time than existing PLC technology or existing graphical user interface programming tools.

BRIEF DESCRIPTION OF THE DRAWINGS

The features and inventive aspects of the present invention will become more apparent upon reading the following detailed description, claims, and drawings, of which the following is a brief description:

DETAILED DESCRIPTION OF A PREFERRED EMBODIMENT

Figure 1:
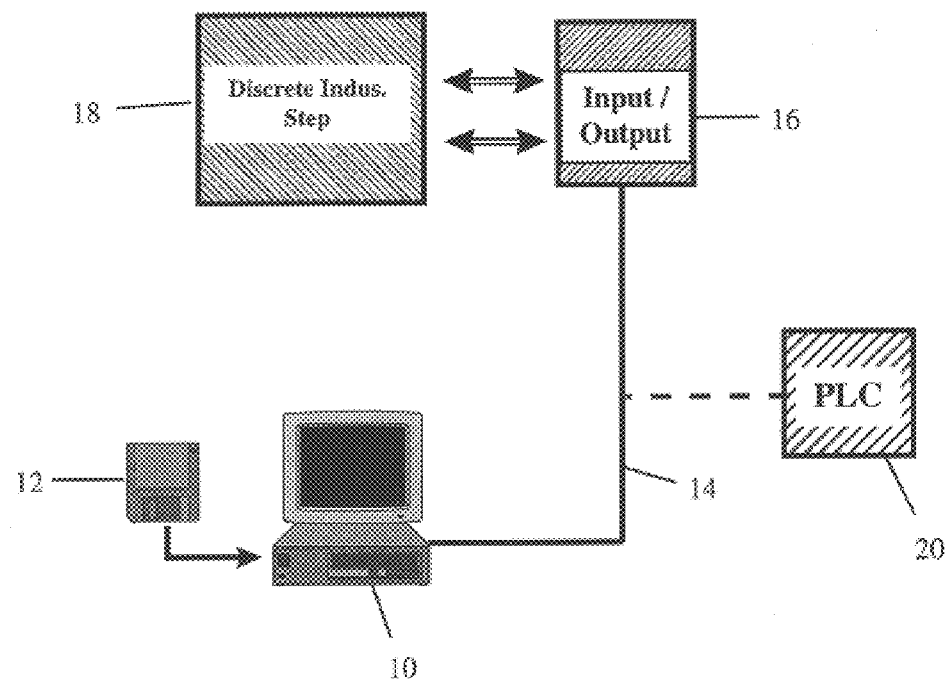
FIG. 1 is a diagrammatic block view of the hardware of the present invention.

Now referring to FIG. 1, the control program hardware apparatus includes a digital computer 10 and controlling program software embodied on floppy disk 12. In a typical hardware arrangement, computer 10 is connected 14 to input/output device 16. Input/output device 16 is controlled via the control program software 12 and interacts with a discrete industrial step 18 which is a subpart of an industrial process. Each discrete industrial step 18 occurs at a predetermined time, or in response to a predetermined parameter, which is either supplied by or measured by input/output device 16, or both. Discrete industrial step 18 may be a continuous process or may be intermediate steps in a larger process. Input/output device 16 provides the external stimuli to digital computer 10, in response to which the control program may cause other industrial events to occur. Alternatively, computer 10 interacts with input/output device 16 through a programmable logic controller 20 (as shown in broken lines).

Using known methods and commercially available control program software packages, an applications engineer may construct a control program for an industrial application. Some commercially available software packages allow for a control program to be constructed in graphical flowchart form. However, a control program is subject to change as the industrial conditions change or to increase efficiency of the industrial process. Most industrial control programs are modified during their life to increase efficiency or eliminate bugs therein, to update industrial processes, or in response to underlying process changes. Some conventionally utilized control systems require that the underlying control operation be discontinued while modifying the control program, resulting in lost manufacturing time. Additionally, discontinuing some industrial processes would result in catastrophic damage to the process equipment.

On-line programming changes refer to the ability to modify a program while it is controlling equipment. Unlike some conventional methods, which require that the controlling operation be discontinued while replacing the controlling program code, online programming changes replace the controlling program code during execution of the industrial process being controlled by that code. Of course, on-line programming changes are only allowable within the confines of safe operation of the industrial process.

The present invention is particularly related to on-line programming changes associated with graphical flowchart-based programming methods. Unlike RLL programs, graphical flowchart-based control programs do not fully execute during each scan of the control logic execution. Where RLL programs completely execute from beginning to end during each scan to regenerate needed state information, a graphical flowchart-based program returns to and continues from where it was last executing on the previous scan. A graphical flowchart program must therefore retain industrial process state information in memory between scans. Industrial process state information is information about the current condition of the machine. It embodies the knowledge of what the machine is doing right now. In order to modify a graphical flowchart-based control program, the modified program must incorporate the existing state information into any changes added to or removed from the execution of the modified program.

According to the present invention, control program flowcharts pause execution between scans at specific predetermined points in the program. These pre-determined points, discrete in number, are referred to as stop points. In the present invention, each stop point of an executing graphical flowchart is assigned a unique index. There is a table of instruction addresses such that the location in the table at the index of a particular stop point contains the instruction address of that stop point. Each stop point also has industrial process state information inherently associated therewith. An on-line programming change according to the present invention takes effect by replacing the executing code when it has reached one of these stop points between scans with a modified code which accounts for all existing state information of the original code, while at the same time replacing the old stop-point table with a new table which accounts for stop-points of the modified code. The modified code is then restarted from a corresponding stop point in the modified code. Depending on the change being made, a stop point in the new flowchart may correspond to one, many, or none of the stop points in the old flowchart. Each stop point in the old flowchart must correspond to exactly one stop point in the new flowchart. By maintaining information about the locations of stop-points in the old program, any modifications to the original program may be undone.

A distinction is made between switching from an existing program to a new, modified program (an on-line programming change) and switching from the modified program back to the original program (undoing the on-line change). In particular, these two switch operations are not perfectly symmetrical.

As described below, the on-line change operation involves substituting a new stop-point table that refers to a new program in place of an existing stop-point table that refers to an old program. Through this substitution, state information held by the old program is transferred to the new program such that the new program begins executing at a stop-point in the new program that corresponds to the state of the old program prior to switching the programs. After the switch, the new program proceeds to execute and generate new state information based upon its own execution.

But if the user decides to undo the on-line change (i.e. perform an on-line change back to the original program), then the state information embodied in the new program's stop-point must be transferred back to the old program. Thus, the stop-point table for the original program must be substituted for the stop point table of the new program.

Reverting to the old program is not simply a matter of replacing the new stop-point table with the old. Because the new program has executed for a period of time, it has developed state information based upon its own execution which may be different from the state requirements of the original program. The state information embodied in the new program has different meaning (due to differences in the programs) from the state information in the old program. As a result, in order to revert to the original program, state information from the new program must be transferred to the original program such that the original program begins re-executing at a stop-point in the original program corresponding to the state of the new program prior to reverting to the original.

As a result, the original program must be associated with two stop-point tables in order to revert to the original program, while the new program must be associated with one stop-point table. One stop point table for the original program is used to switch from the original program to the new program, while the second stop-point table for the old program is used to make the switch back from the new program to the original program. In this way, the modified flowchart control program is able to account for all stop points and state information of the original program while allowing on-line programming changes to a new program. The flowchart control program is also able to "Undo" or revert back to the original control program while accounting for all state information associated with execution of the new program.

Figure 2:
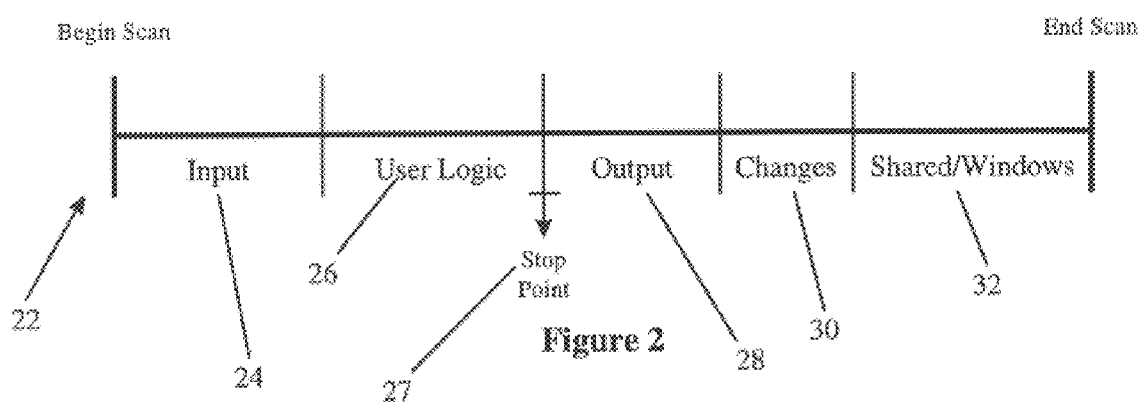
FIG. 2 is a diagrammatic view visualizing a control program computer scan.

FIG. 2 demonstrates a typical CPU process scan 22 for a PC which is not dedicated to industrial control. Scan 22 is repeated at a rate dependent upon the speed and power of the PC, which is usually many times per second. During the first segment of each scan 22, the PC receives input state data 24 from various sensors associated with the industrial process and/or reads the needed data from stored locations. During the next segment of time, the input state data 24 is operated on by user logic operations 26 programmed into the flowchart control program. In order to leave user logic operations 26, the underlying control program must reach a stop point 27 at which user logic operations may be suspended. At the point where user logic operations are suspended due to reaching a stop point 27 in the executing control program, new state information is saved and control parameters are changed due to output data 28 generated by the control code. Output data 28 represents current machine control information for the executing code, and at least a portion of output data 28 becomes input data 24 during the next consecutive scan by the PC.

According to the present invention, all changes to an underlying executing code occur after output data 28 is generated during segment 30 of scan 22. Because execution of user logic 26 of the next scan incorporates information stored as output 28 of the previous scan, output information 28 may not be discarded. Moreover, user logic 26 of the next consecutive scan begins from the stop point 27 reached at the conclusion of the previous scan. To insert any changes 30 to an executing flowchart control program, the modified code must commence execution from a stop point in the new code which corresponds to stop point 27 of the previous scan. Finally, at least a portion 32 of scan 22 is dedicated to allowing shared processes, e.g. Windows® applications, a portion of CPU scan time. Upon the completion of shared portion 32, the scan process is repeated.

Figure 3:
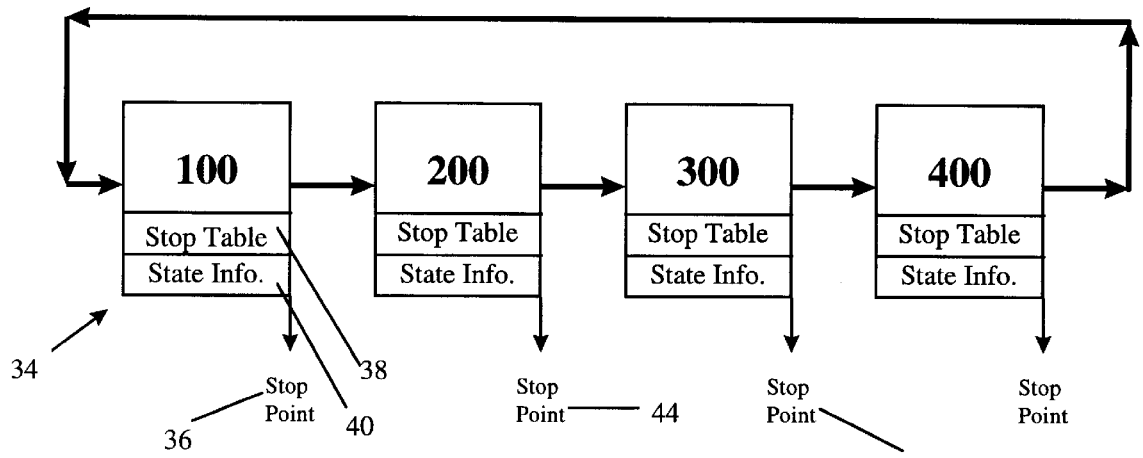
FIG. 3 is a diagrammatic view visualizing consecutive scans of four flowchart control programs each with its own stop point.
Figure 4:
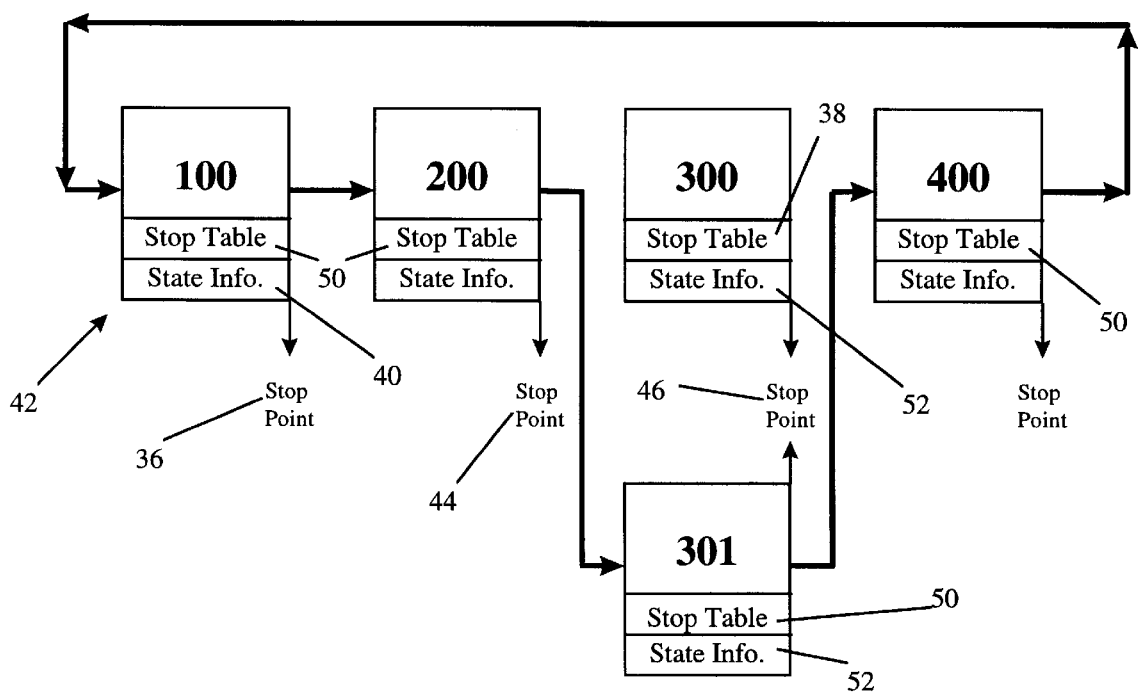
FIG. 4 is a second diagrammatic view visualizing consecutive scans of four flowchart control programs each with its own stop point, modified in accordance with the present invention.

As seen in FIGS. 3 and 4, a typical flowchart control application is subdivided into multiple flowchart programs. In particular, control application 34, shown in FIG. 3, is subdivided into four programs (100, 200, 300 and 400) each of which has one or more stop points 36. The number of stop points and sections in FIGS. 3 and 4 is illustrative only, for there is no limit to the number of stop points a control program may contain. During user logic segment 26 of scan 22, a program of application 34 will execute until it reaches a stop point 36. A program, such as program 200 of FIG. 3, may not stop executing during user logic segment 26 until it reaches a stop point. Likewise, scan 22 may not move on to output segment 28 until each executing program of the control application reaches a stop point 36.

Executing application 34 maintains a stop point table 38, which links to each program 100, 200, 300 and 400 of application 34 and signals the position of each stop point 36, thereby defining the current execution of each program. In addition, each program 100, 200, 300 and 400 of executing application 34 generates and maintains state information 40 for the process being controlled by application 34. Each stop point 36 therefore has state information 40 associated therewith. The execution environment for the running application maintains a list of the programs to be run during each scan of the application. This list is traversed sequentially, executing each program until it reaches a stop point. When all programs have reached a stop point, user logic segment 26 of scan 22 is complete.

In FIG. 4, a modified executing application 42 is shown, having replaced program 300 of application 34 with program 301 to create application 42. Program 301 is inserted into the list after program 200 and ends at new stop point 46. Program 300 of application 34 is therefore replaced by program 301. Upon insertion of program 301 for program 300, stop point table 38 of application 34 is replaced in all programs 100, 200, 301 and 400 of application 42 with new stop point table 50. New stop point table 50 now identifies all stop points of new executing application 42. But when changing program 300 to program 301, information 52 must be passed to program 301 in order to seamlessly transition old application 34 into new application 42.

In practice, both programs 300 and 301 are maintained in memory until it is ascertained that program 301 adequately and accurately performs and implements the requested changes. If program 301 is defective in any way, it is a simple matter to replace program 301 with the original program 300 and to change the stop point tables back from table 50 to original table 38, thereby providing an "Undo" function. If program 301 is acceptable, then program 300 may be deleted from memory, and the on-line programming change is complete.

Figure 5:
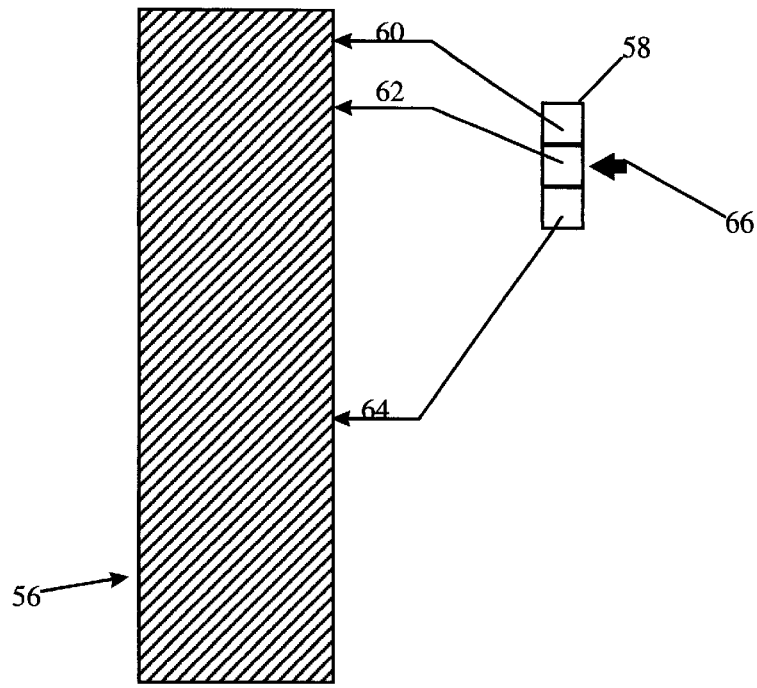
FIG. 5 is a diagrammatic view visualizing a flowchart control program reduced to an executable code.
Figure 6:
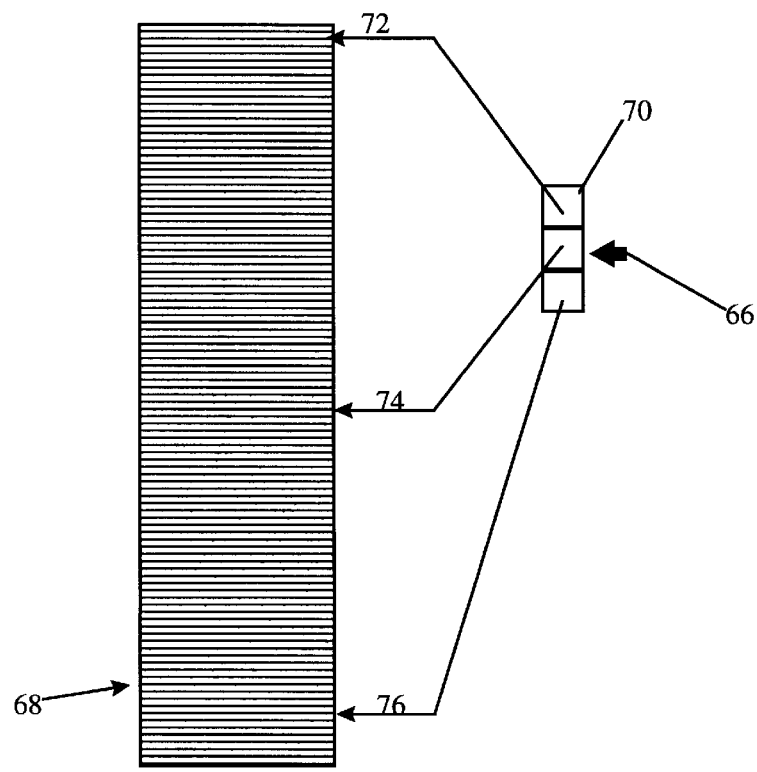
FIG. 6 is a diagrammatic view visualizing a second flowchart control program reduced to an executable code.
Figure 7:
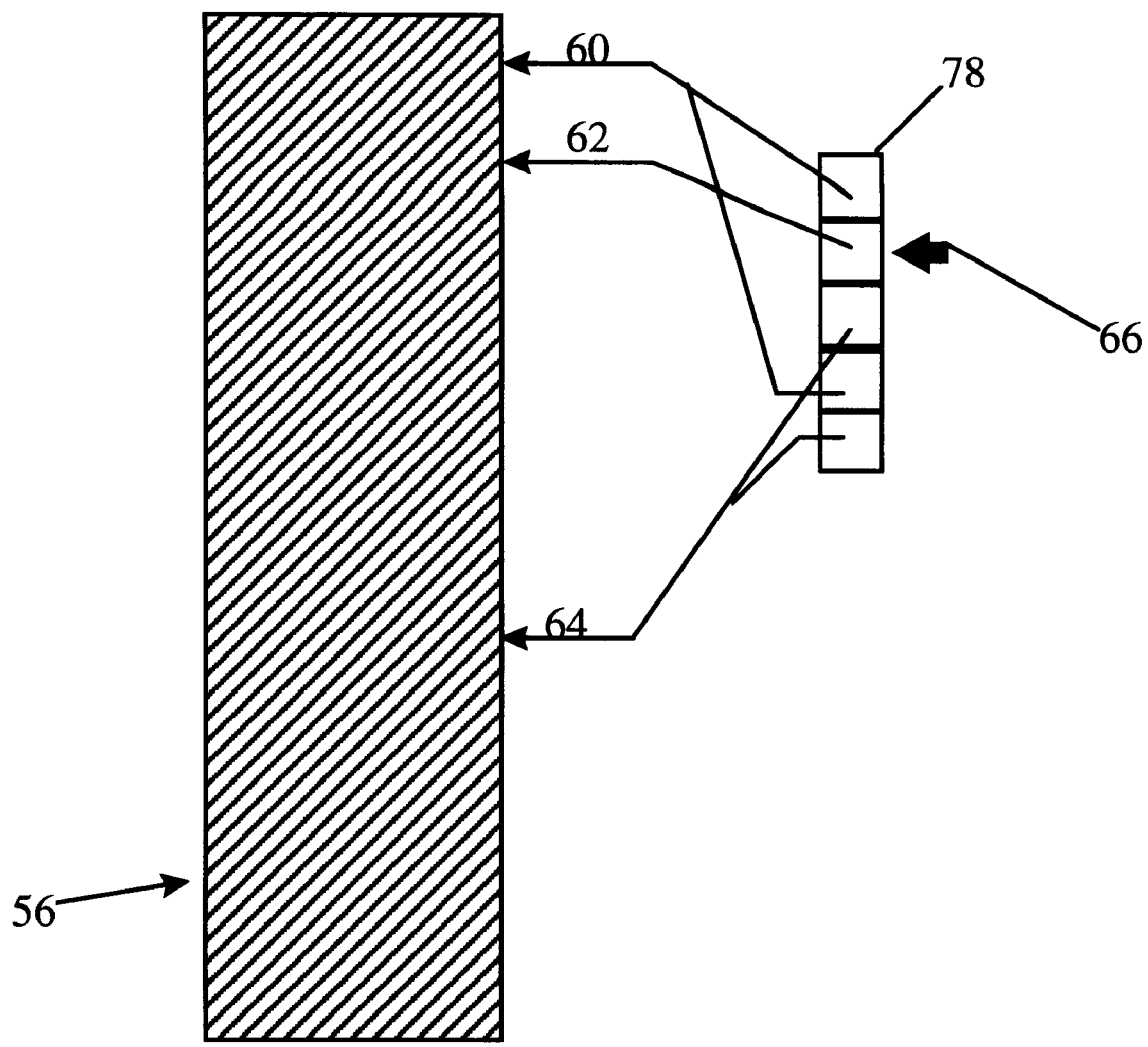
FIG. 7 is a diagram of the logic for on-line switching of flowchart programs from an old flowchart to a new flowchart while maintaining state information.

An alternative visualization of the present invention is demonstrated with reference to FIGS. 5, 6 and 7. In FIG. 5, a control program 56 is visualized as reduced to an executable code. Control program 56 includes a plurality of instruction sets, actions, input/output steps, and any other steps ordinarily contained within programs of this type. During execution of control program 56 during user logic segment 26 (seen in FIG. 2), a starting instruction address for execution is found from stop-point table 58. Various instruction sections within control program 56 end with stop points, indicated by arrows 60, 62 and 64. Stop points shown by arrows 60, 62 and 64 also indicate the starting instruction set for the next consecutive section of control program 56. Each stop point 60, 62 and 64 also is associated with known industrial process state information which defines the state of the underlying industrial process.

According to the present invention, each stop point of the executing control program 56 is assigned an unique memory address. The addresses are compiled in stop-point table 58, such that each address represents a particular stop point for executing control program 56. During execution of control program 56, a stop point index 66 indicates which entry in table 40 is to be used at a given point, thereby indicating which section of control program 56 is executing during a given user logic scan 26.

To switch from old control program 56 to a new control program 68, seen in FIG. 6, only the addresses contained in stop-point table 58 need be modified. As shown in FIG. 6, a modified stop-point table 70 containing addresses for new stop points 72, 74 and 76 replaces stop-point table 58 such that stop-point table 70 now points to new control program 68. In order for this switch to be valid, stop-point table 70 must refer to at least an identical number of stop points as stop point table 58. Accordingly, only the addresses contained in stop point table 70 are changed to refer to new address locations within new control program 68. In practice, after control program 56 reaches a stop point indicated by the stop point index 66, stop-point table 58 is replaced by new stop-point table 70 during Changes segment 30 (see FIG. 2) of a CPU scan. However, stop point index 66 continues to point to a particular corresponding stop point within stop point table 70. Any state information from the underlying industrial process for the stop point at which the change in stop-point tables was replaced is associated with the corresponding stop point in control program 68 at which execution is continued.

When new control program 68 restarts, stop point index 66 indicates which entry in the table 70 is to be used, and also which state information exists in the underlying industrial process. Through this indirect method of getting the instruction address to restart the program it becomes a simple process to load an altered version of the program, since the array of instruction addresses will have changed for the new program. Thus, to switch from the old flowchart code 56 to the new flowchart code 68 is a simple matter of replacing the stop point table 58 with a new stop-point table 70 such that stop point index 66 points to a stop point within the new table 70.

As pointed out above, it is possible that stop points are added or deleted or both between the old flowchart and the new flowchart. If no stop points have been added or deleted between the old and the new control programs, then the index from the old program is known to be valid in the new program. However, if stop points have been added or deleted, then both stop point tables must be adjusted such that every index in both tables points to a valid stop point in the associated flowchart. FIG. 7 demonstrates the approach for adjusting the number of stop points in the old stop point table in the case that a new flowchart control program adds stop points. In the situation of FIG. 7, the new flowchart (not shown) includes five stop points, while the old chart (FIG. 5) includes three stop points. In this situation, stop point table 58 of FIG. 5 is enlarged to five stop points in stop-point table 78 of FIG. 7. Even though no actual stop points were added to the old code 56, stop points must be assigned to the two additional stop-point table memory slots. Assigning actual stop points to the additional memory slots is necessary to ensure a valid stop-point table switch, and to allow for the possibility that the changes implemented by the new code must be replaced by the old code. In FIG. 7, the new stop point memory locations point redundantly to existing stop points 60 and 64. Thus, the new code (not shown) has five stop points, and the old code 56 also has five stop points, thereby allowing the new code to be replaced by the old code via an "Undo" operation as described above.

Figure 8:
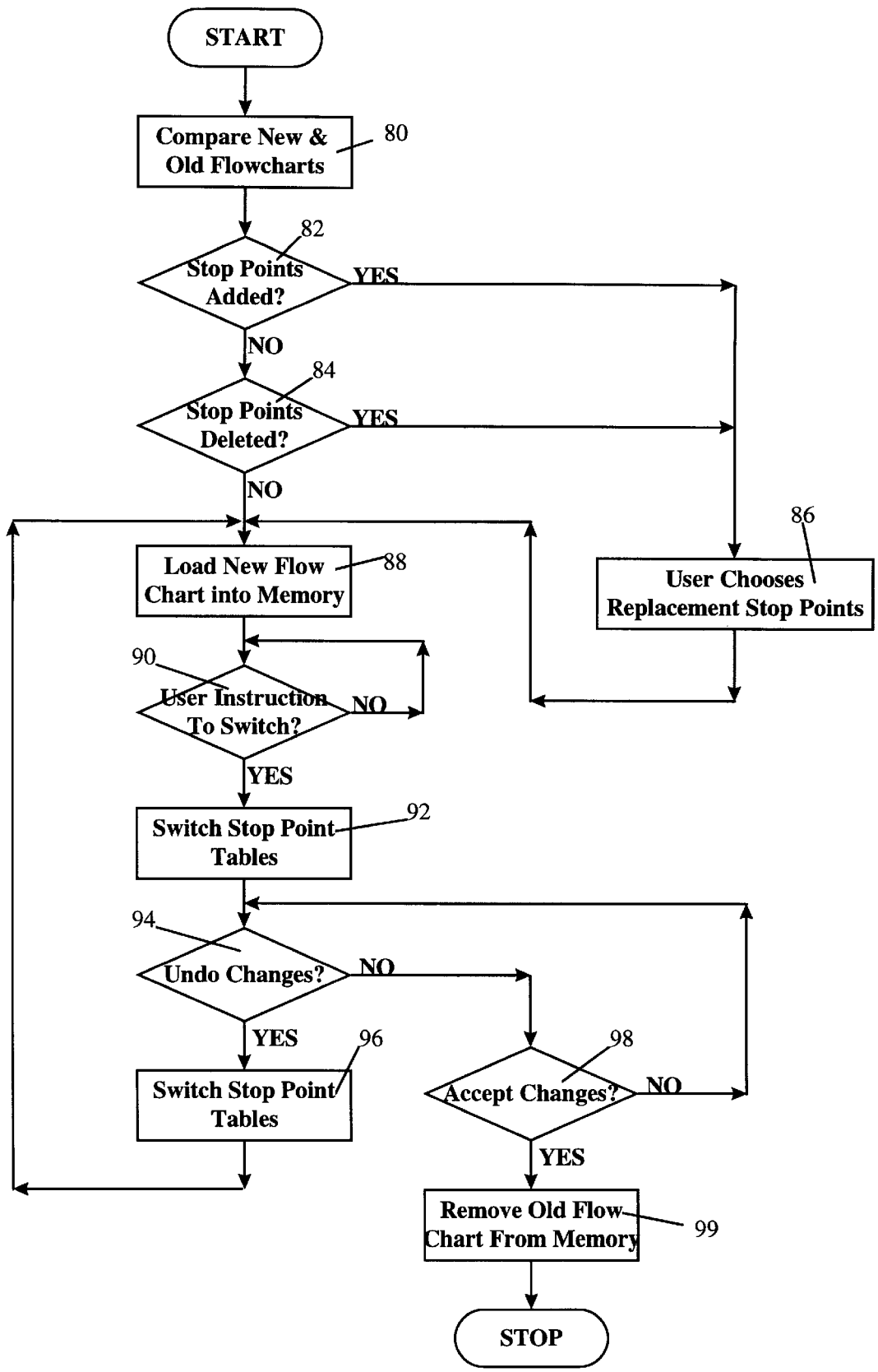
FIG. 8 is a logic flow diagram for switching from an old flowchart program to a new flowchart program.

A logic flowchart for on-line switching of flowchart program from an old flowchart to a new flowchart is shown with reference to FIG. 8. According to FIG. 8, at step 80 old and new flowcharts are compared. A determination of whether stop points have been added is made at decision point 82. If no stop points have been added, a determination is made as to whether or not stop points have been deleted in the decision block marked 84 in FIG. 8. If stop points have either been added or deleted, the control program user is allowed to choose replacement stop points at 86, subject to the requirement that any replacement stop points in the new flowchart must have corresponding stop points in the old control program flowchart and vice-versa. After a determination that no stop points have been added and no stop points have been deleted or after the user chooses replacement stop points for any stop points added or deleted, the new flowchart is loaded into memory at step 88. At step 90, the user is prompted for an instruction to switch the new flowchart with the old flowchart. If the user answers in the affirmative, stop point tables are switched at step 92. The user is then prompted in step 94 whether to undo the changes that have been made. If the user responds affirmatively in step 94, then stop point tables are switched back in step 96, after which the user is returned to step 90 for an instruction to switch the stop tables again. If the user does not wish to undo the changes in step 94, the user is asked to accept the changes made in step 98. If the user does not wish to accept the changes in step 98, the user is returned to step 94 and is asked to undo changes. However, if the changes are accepted in step 98, the old flowchart is removed from memory in step 99, thereby completing the on-line switching of flowchart programs.

Through the present invention, a control program developer is allowed to modify a control program while that program is controlling equipment without losing industrial process state information. By recognizing in an execution model utilizing graphical flowchart programming techniques that flowcharts stop executing between scans at specific pre-determined points in the program, the programmer is able to choose at which point programming changes will take effect by selecting an appropriate stop point. At the selected stop point, the on-line programming change takes effect simply by replacing the executing code when it reaches one of these stop points while maintaining state information, and subsequently restarting each flowchart program from the corresponding stop points in the new code. The present invention thereby allows control program developers to decrease the time it takes to implement a modified control program and the time required to integrate that program into the industrial manufacturing process. Because programming changes take effect on-line, down-time of the system is minimized. Minimizing down-time maximizes productivity of the industrial process. Furthermore, reducing the time it takes a control programmer to implement changes in a control process further increases both productivity and efficiency of the industrial process. Thus, the programmer may achieve faster software implementation and less manufacturing down-time than that currently afforded by existing PLC technology or by existing graphical user interface programming tools.

Preferred embodiments of the present invention have been disclosed. A person of ordinary skill in the art would realize, however, that certain modifications would come within the teachings of this invention. Therefore, the following claims should be studied to determine the true scope and content of the invention.

What is claimed is:

1. A method of on-line programming changes to a computer implemented software system for programming industrial logic controllers, of the type using a graphical flowchart representation of a controller program, comprising the steps of:
   (a) identifying a set of stop-points within an executing first control program, said stop points having unique addresses, said addresses maintained in a first stop-point table, said first stop-point table having industrial process state information associated therewith; and
   (b) replacing said first stop-point table with a second stop-point table when execution of said executing first control program reaches one of said stop points, said second table containing stop point addresses identified with a second control program and associated with said industrial process state information.

2. A method of on-line programming changes as in claim 1, wherein the number of stop points in said first control program is not equal to the number of stop points in said second control program.

3. A method of on-line programming changes as in claim 1, wherein the number of stop points in said first control program is equal to the number of stop points in said second control program.

4. A method of on-line programming changes as in claim 1, wherein state information is passed between said second control program and said first control program.

5. A method of on-line programming changes as in claim 4, wherein said steps occur after said state information is output from User Logic sections of a CPU scan during execution of said first control program.

6. A method of on-line programming changes as in claim 1, wherein said steps occur after state information is output from User Logic sections of a CPU scan during execution of said first control program.

7. A computer readable storage device used to direct an on-site computer to execute an on-line programming change to a graphical flowchart representation of a control program, the programming change comprising the steps of:
   (a) identifying a set of stop-points within an executing first control program, said stop points having unique addresses and associated with a first set of industrial process state information, said addresses maintained in a first stop-point table; and
   (b) replacing said first stop-point table with a second stop-point table when execution of said executing first control program reaches one of said stop points, said second table containing stop point addresses identified with a second control program and associated with said first set of industrial process state information.

8. A computer readable storage device as in claim 7, wherein the programming change causes state information to be passed between said second control program and said first control program.

9. A computer readable storage device as in claim 8, wherein the programming change performs said steps after said state information is output from User Logic sections of a CPU scan during execution of said first control program.

10. A computer readable storage device as in claim 9, wherein the number of stop points in said first control program is equal to the number of stop points in said second control program.

11. A computer readable storage device as in claim 9, wherein the number of stop points in said first control program is not equal to the number of stop points in said second control program.

12. A computer readable storage device as in claim 7, wherein the programming change performs said steps after state information is output from User Logic sections of a CPU scan during execution of said first control program.

13. A system for executing an on-line programming change to a digital computer controlled application program, comprising:
   (a) means for identifying a set of stop-points within an executing first control program, said stop points having unique addresses,
   (b) means for maintaining said addresses in a first stop-point table; and
   (c) means for replacing said first stop-point table with a second stop-point table when execution of said executing first control program reaches one of said stop points, wherein said second table contains stop point addresses identified with a second control program, said second table containing an equal number of stop point addresses as said first table
   (d) means for passing industrial process state information between said first control program and said second control program.

14. A system for executing an on-line programming change as in claim 1, wherein steps (c) and (d) occur after said state information is output from User Logic sections of a CPU scan during execution of said first control program.

15. A system for executing an on-line programming change as in claim 13, wherein step (c) occurs after state information is output from User Logic sections of a CPU scan during execution of said first control program.

16. In a first executing flowchart control program having a first set of known stop points at which the control program pauses execution between successive scans of the control program, the instruction address locations of each stop point retained in a first stop point table, each of the stop points having industrial program state information associated therewith, a method of on-line programming changes comprising the steps of:

(a) modifying at least a portion of the flowchart control program in accordance with desired changes to create a modified flowchart control program;

(b) replacing the first executing flowchart control program at one of the known stop points with said modified flowchart control program, said modified flowchart control program including a set of second stop points retained in a second stop point table and associated with the industrial program state information;

(c) replacing the first stop point table with said second stop point table, thereby preserving the industrial program state information; and (d) restarting said modified flowchart control program from one of said second stop points.

* * * * *